(12) United States Patent
Chiesa et al.

(10) Patent No.: US 11,444,875 B2
(45) Date of Patent: Sep. 13, 2022

(54) PER-PACKET LOAD-BALANCING OVER MULTIPLE NETWORK PATHS

(71) Applicant: Cisco Technology, Inc., San Jose, CA (US)

(72) Inventors: Luca Della Chiesa, Concorezzo (IT); Christian Schmutzer, Koenigsbrunn im Weinviertel (AT); Patrice Brissette, Ontario (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/032,874

(22) Filed: Sep. 25, 2020

(65) Prior Publication Data

US 2022/0103480 A1   Mar. 31, 2022

(51) Int. Cl.
| | |
|---|---|
| *H04L 47/125* | (2022.01) |
| *H04L 47/726* | (2022.01) |
| *H04L 12/46* | (2006.01) |
| *H04L 45/24* | (2022.01) |
| *H04L 47/41* | (2022.01) |

(52) U.S. Cl.
CPC ........ *H04L 47/125* (2013.01); *H04L 12/4641* (2013.01); *H04L 45/24* (2013.01); *H04L 47/41* (2013.01); *H04L 47/726* (2013.01)

(58) Field of Classification Search
None
See application file for complete search history.

(56) References Cited

U.S. PATENT DOCUMENTS

| | | | |
|---|---|---|---|
| 7,852,881 B2 | 12/2010 | Schumann-Olsen | |
| 2004/0156313 A1 | 8/2004 | Hofmeister et al. | |
| 2007/0019547 A1 | 1/2007 | Ho et al. | |
| 2010/0284397 A1 | 11/2010 | Poulin et al. | |
| 2014/0186034 A1* | 7/2014 | Bialkowski | H04L 47/12 398/45 |
| 2017/0317925 A1* | 11/2017 | Chase | H04L 12/4645 |
| 2019/0140924 A1 | 5/2019 | Koponen et al. | |
| 2020/0403928 A1* | 12/2020 | Amend | H04L 45/24 |
| 2021/0119930 A1* | 4/2021 | Debbage | H04L 1/1642 |

OTHER PUBLICATIONS

Sainath Bavugi, "Detection and Re-routing of elephant flows in a Software Defined Networking to avoid traffic congestion", Semantic Scholar, Sep. 16, 2018, 20 pages.

(Continued)

*Primary Examiner* — Christine T Duong
(74) *Attorney, Agent, or Firm* — Edell, Shapiro & Finnan, LLC

(57) ABSTRACT

Techniques are presented herein for load-balancing a sequence of packets over multiple network paths on a per-packet basis. In one example, a first network node assigns sequence numbers to a sequence of packets and load-balances the sequence of packets on a per-packet basis over multiple network paths of a network to a second network node. The second network node buffers received packets that are received over the multiple network paths of the network from the first network node and re-orders the received packets according to sequence numbers of the received packets.

20 Claims, 6 Drawing Sheets

(56) References Cited

OTHER PUBLICATIONS

Wikipedia, "Inverse Multiplexer", last edited Dec. 29, 2019, 2 pages. https://en.wikipedia.org/wiki/Inverse_multiplexer.
Wikipedia, "Inverse Multiplexing for ATM", last edited Jan. 25, 2020, 1 page. https://en.wikipedia.org/wiki/Inverse_Multiplexing_for_ATM.
Wikipedia, "Point-to-Point Protocol", last edited Aug. 14, 2020, 8 pages. https://en.wikipedia.org/wiki/Point-to-Point_Protocol.
Howard Frazier et al., "Physical Layer Aggregation", IEEE 802.3 HSSG, Sep. 2006, 40 pages.
Wikipedia, "Fibre Channel", last edited Jun. 23, 2020, 14 pages. https://en.wikipedia.org/wiki/Fibre_Channel.
Shashi Shekhar Sharma, "MPLS L2VPN Pseudowire", Cisco Technology, Inc., retrieved from Internet Aug. 19, 2020, 16 pages.
Cisco Technology, Inc., "MPLS Pseudowire for Cable L2VPN", retrieved from Internet Aug. 19, 2020, 36 pages.
Kumar Sridhar, "Pseudowire Concepts and troubleshooting", retrieved from Internet Aug. 19, 2020, 10 pages.
Neil Jerram et al., "MPLS in Optical Networks", Metaswitch Networks, Oct. 2001, 59 pages.
Wikipedia, "Ethernet Frame", last edited Jul. 27, 2020, 7 pages. https://en.wikipedia.org/wiki/Ethernet_frame.
Aditya Akella, "CS 640: Introduction to Computer Networks", Lecture 5—Encoding and Data Link Basics, retrieved from Internet Aug. 17, 2020, 6 pages.
Stack Overflow, "bit manipulation—efficient way to split ONE bitstream according to many masks?", retrieved from Internet Aug. 3, 2020 , 4 pages.
Super User, "video—how to split a bitstream with ffmpeg", retrieved from Internet Aug. 3, 2020, 4 pages.

\* cited by examiner

PER-PACKET LOAD-BALANCING OVER MULTIPLE NETWORK PATHS

TECHNICAL FIELD

The present disclosure relates to telecommunications technology.

BACKGROUND

Service providers can deliver private line services using Time-Division Multiplexing (TDM) and Wavelength-Division Multiplexing (WDM) technology. Adopting a circuit emulation concept, referred to as Private Line Emulation (PLE), eliminates the need for deploying and maintaining a dedicated TDM switching infrastructure, such as Synchronous Optical Networking (SONET)/Synchronous Digital Hierarchy (SDH) and Optical Transport Network (OTN). PLE can thereby enable service providers to keep up with growing traffic demands and secure profitable service delivery.

DESCRIPTION OF EXAMPLE EMBODIMENTS

Overview

Techniques are presented herein for load-balancing a sequence of packets over multiple network paths on a per-packet basis. In one example embodiment, a first network node assigns sequence numbers to a sequence of packets and load-balances the sequence of packets on a per-packet basis over multiple network paths of a network to a second network node. The second network node buffers received packets that are received over the multiple network paths of the network from the first network node and re-orders the received packets according to sequence numbers of the received packets.

EXAMPLE EMBODIMENTS

Figure 1:
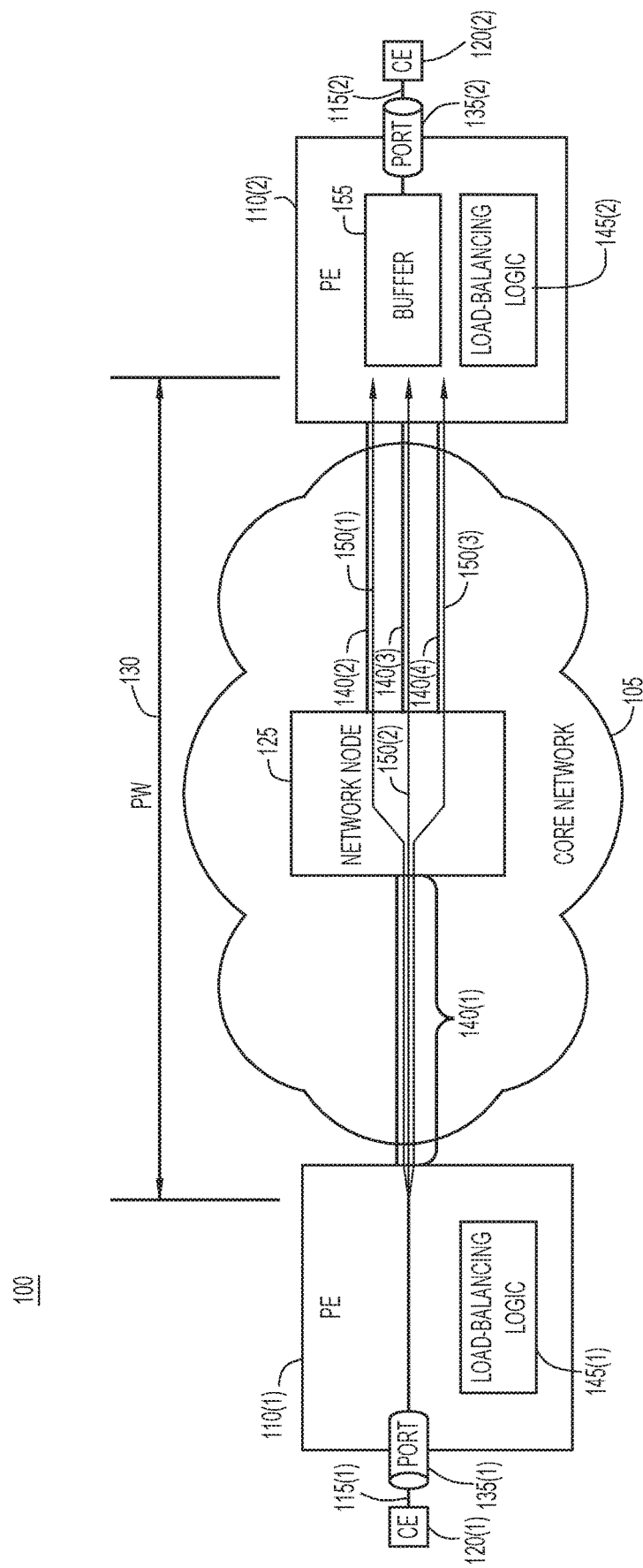
FIG. 1 illustrates a block diagram of a system configured for per-packet load-balancing over multiple network paths that include respective parallel links, according to an example embodiment.

[no] FIG. 1 illustrates a block diagram of an example system 100 configured for per-packet load-balancing. System 100 includes core network 105, network nodes (e.g., ingress and egress Provider Edge devices (PEs), respectively) 110(1) and 110(2), Attachment Circuits (ACs) 115(1) and 115(2), and Customer Edge devices (CEs) 120(1) and 120(2). Core network 105 includes network node 125, which is configured to carry Pseudowire (PW) network packets between PEs 110(1) and 110(2). In one example, PW 130 is configured on PE nodes 110(1) and 110(2), and network node 125 is agnostic to PW 130. PEs 110(1) and 110(2) include ports (e.g., client ports) 135(1) and 135(2), which are connected via PW 130.

In one example, core network 105 may run Multiprotocol Label Switching (MPLS), an Interior Gateway Protocol (IGP) such as Open Shortest Path First (OSPF) or Intermediate System-to-Intermediate System (IS-IS), or any combination thereof. Core network 105 may also run a traffic engineering protocol such as Resource Reservation Protocol for Traffic Engineering (RSVP-TE) or Segment Routing for Traffic Engineering (SR-TE). PW 130 may be established via Targeted Label Distribution Protocol (T-LDP) for Virtual Private Wire Service (VPWS) or via Border Gateway Protocol (BGP) as defined by Ethernet Virtual Private Network for VPWS (EVPN-VPWS), and ACs 115(1) and 115(2) may utilize Synchronous Optical Network (SONET), Ethernet, or Optical Transport Networking (OTN) technology.

However, any suitable paradigm/protocol may be utilized in conjunction with the techniques presented herein. For example, any suitable Packet-Switched Network (PSN) may use any suitable packet switching and/or tunneling technology, such as Layer 2 Tunneling Protocol (L2TP), User Datagram Protocol (UDP), Internet Protocol (IP), etc. Core network 105 may also/alternatively be based on IP or Segment Routing for IP version 6 (SRv6).

To enable CEs 120(1) and 120(2) to communicate with each other, system 100 may provide a bit transparent packet connection in the form of a Private Line Emulation (PLE) circuit that includes PW 130 between ports 135(1) and 135(2) across core network 105. To that end, PEs 110(1) and 110(2) may be configured to communicate using PLE techniques, although it will be appreciated that techniques described herein may also apply to non-PLE scenarios. In one example, PE 110(1) obtains a sequence of bits from CE 120(1), via port 135(1), and converts the sequence of bits to a sequence of packets. The sequence of bits may be a subset or given amount of bits of a constant/continuous (or near-constant/continuous) stream of bits obtained from CE 120(1) (e.g., a jumbo-flow Ethernet stream).

PE 110(1) may encapsulate the sequence of bits packet-by-packet and send the packets (e.g., an "elephant" flow) across core network 105 over high-capacity PLE emulation connections. For example, PE 110(1) may obtain a first subset of the stream of bits, encapsulate the first subset of bits in a first packet, and send the first packet (including the first subset of bits as the payload) over core network 105. PE 110(1) may then obtain a second subset of the stream of bits, encapsulate the second subset of bits in a second packet (including the second subset of bits as the payload), and send the second packet over core network 105. PE 110(1) may repeat this process continuously (or near-continuously) to ensure that the continuous (or near-continuous) stream of bits is sent over core network 105. The sequence of packets may be sent at a rate based on port speed, and in one example there is no visibility of potential communication flows received via the port.

Core network 105 carries the sequence of packets to PE 110(2) over PW 130, which may emulate a physical wire through a point-to-point connection between PEs 110(1) and 110(2). Upon obtaining the sequence of packets, PE 110(2) converts the sequence of packets back to the sequence of bits. For example, PE 110(2) may decapsulate the first packet and transmit the payload (i.e., the first subset of bits) to CE 120(2) via port 135(2), decapsulate the second packet and transmit the payload (i.e., the second subset of bits) to CE 120(2) via port 135(2), etc. PE 110(2) may repeat this process continuously (or near-continuously).

Consider an example in which CE 120(1) sends a 100 GE bit stream to CE 120(2). In this example, core network 105 includes link (e.g., interface) 140(1) between PE 110(1) and network node 125, as well as three parallel links (e.g., interfaces) 140(2)-140(4) between network node 125 and PE 110(2). Ports 135(1) and 135(2) are configured to carry a maximum of 100 GE of network traffic, link 140(1) is configured to carry a maximum of 400GE of network traffic, and links 140(2)-140(4) are each configured to carry a maximum of 100GE of network traffic. Packet encapsulation overhead introduces additional information that needs to be transported over core network 105 (e.g., an additional 20 Gbps). As such, the emulated 100GE connection between CE 120(1) and CE 120(2) may require a total of 120 Gbps of bandwidth (100 Gbps for the 100GE from CE 120(1) plus the additional 20 Gbps of packet encapsulation overhead). The additional amount of packet encapsulation overhead (here, 20 Gbps) may be such that packets are prevented from being transported between PE 110(1) and PE 110(2) over the same rate as ACs 115(1) and 115(2). It will be appreciated that the additional 20 Gbps of packet encapsulation overhead is merely an example, and any suitable fixed or variable additional amount of packet encapsulation overhead may be introduced (e.g., 15 Gbps of packet encapsulation overhead or more).

In this example, it is not possible for the emulated 100GE connection to successfully cross a network over only 100GE links, because the sequence of packets for the emulated 100GE connection requires 120 Gbps of bandwidth. This would typically create bandwidth issues in conventional systems. For example, conventionally PE 110(1) would successfully provide the necessary 120 Gbps of network packets over link 140(1) to network node 125, but network node 125 would fail to provide the necessary 120 Gbps over any one of links 140(2)-140(4). This is because link 140(1) can accommodate a maximum of 400GE of network traffic, but links 140(2)-140(4) can only accommodate a maximum of 100GE of network traffic each.

Moreover, traditional load-balancing techniques would not help conventional systems transport the network packets across core network 105 because such techniques are flow-based. Existing approaches involve load-balancing packets according to flow information available in the packets. The flow information may be, for example, the 5-tuple of a given packet (e.g., the source IP address, the destination IP address, the Layer 4 (L4) protocol type, the L4 source port, and the L4 destination port). The packets can be hashed based on the flow information and then load-balanced across different network paths according to the hashing result. For example, any packets containing a first 5-tuple may be routed over a first network path, and any packets containing a second 5-tuple may be routed over a second network path.

In the aforementioned example, however, every packet in the sequence of packets includes identical flow information. The sequence of packets originates from the same unstructured bit stream, and information such as source IP address, the destination IP address, the L4 protocol type, the L4 source port, and the L4 destination port does not exist in the PLE context because the payload represents one or more bits. The client traffic is processed during encapsulation at the bit level without any awareness of packets or packet header information. In other words, the PLE transport (e.g., PLE VPWS transport) transparently emulates the bit stream without knowledge of any structure or communication flows within the VPWS and as a result there is no way to identify smaller flows on which to load-balance.

Traditional load-balancing approaches assume that flow granularity is very small compared to the link speed (e.g., Mbps compared to 100GE links). Such approaches also assume that many flows (e.g., hundreds or even thousands) exist and are equally spread across all available parallel links. Under these assumptions, conventional approaches operate under the conclusion that in order to carry the total traffic load L from a source to a destination, it is enough simply to deploy N number of interfaces of speed I such that L<N*I. However, these assumptions/conclusion are inapplicable to many real-world scenarios, which may include large- and variable-sized flows.

It will be appreciated that 100GE is merely used as an example, and this can apply to any port with a rate equal to or higher than the smallest interface rate in core network 105. Conventional techniques require all interfaces along the network path from the source to the destination to be greater than 100GE (e.g., 200GE, 400GE, etc.) in order to allow for 100GE PLE connections to be delivered. This is not a practical solution, as 400GE interfaces are only slowly becoming deployable across the wide area network carrier infrastructure or optical performance penalties may not allow operating a wavelength at 400 Gbps in a Dense Wavelength Division Multiplexing (DWDM) network. Furthermore, once the 400GE interfaces are widely available, that alone will not solve this problem. Instead, customers will begin requesting 400GE PLE connections, which will remain out of reach until the next higher Ethernet rate (e.g., 800GE, 1.2 T, etc.) becomes available and deployed in the network to enable sufficiently fast network links capable of delivering the required capacity for emulated 400GE elephant flows.

Thus, the same problem applies for connections of any GE value emulated traffic. For example, when 400GE client connections become available the same challenge may be present even if the network already has 400GE links in place. This problem may also apply to Fibre Channel, which is defined beyond 100 Gbps, and to ODU4 or ODUCn when OTN ports are interconnected. The fundamental challenge is that sufficiently fast trunk technology is not yet available or optical fiber transmission performance does not allow for the necessary trunk speeds to be deployed. Employing conventional techniques, customers will continue to revert back to OTN switching and Reconfigurable Optical Add-Drop Multiplexer (ROADM) technology to deliver high capacity client connections.

Accordingly, load-balancing logic 145(1) and 145(2) are provided on PEs 110(1) and 110(2), respectively, to enable load-balancing of a single elephant flow on a per-packet basis. In particular, PEs 110(1) and/or 110(2) may load-balance a sequence of packets over multiple network paths even if each packet in the sequence has identical/insufficient flow information and would be routed over a single network path by conventional techniques. Thus, techniques provided herein may enable transfer of high capacity emulation circuits over a packet network with bandwidth-limited interfaces by steering pseudowire traffic across one or more traffic-engineered paths having an appropriate amount of available/committed bandwidth. This may enable network traffic to be spread across multiple paths in a packet-per-packet manner.

More specifically, PE 110(1) may load-balance the sequence of packets from PE 110(1) over network paths 150(1)-150(3) on a per-packet basis to PE 110(2). Network paths 150(1)-150(3) may belong to a network (e.g., a network comprising core network 105). Network path 150(1) includes link 140(1) and link 140(2). Network path 150(2) includes link 140(1) and link 140(3). Network path 150(3) includes link 140(1) and link 140(4). Thus, link 140(1), which can accommodate a maximum of 400GE of network traffic, carries all 110 Gbps of network traffic, but the network traffic is routed across links 140(2)-140(4) on a per-packet basis to achieve an appropriate rate for each of links 140(2)-140(4).

For example, links 140(2)-140(4) may carry 30 Gbps, 40 Gbps, and 40 Gbps of the network traffic, respectively, which is lower than the maximum bandwidth capacity of 100GE for each of links 140(2)-140(4). Splitting the sequence of packet on a per-packet basis lowers the bandwidth requirement and provides more options for suitable end-to-end network paths (e.g., network paths 150(1)-150(3)) to PE 110(2). In one example, network paths 150(1)-150(3) may be traffic-engineered paths that provide guaranteed bandwidth.

As shown, the sequence of packets may be split/load-balanced before entering core network 105. It may be preferable for PE 110(1) to perform the load balancing (rather than, e.g., network node 125), because PE 110(1) may be aware of PW 130. PE 110(1) may split the emulated network traffic on a packet-per-packet basis over a configurable number of network paths. Core network 105 may carry the split network traffic together (e.g., over link 140(1)) and/or across different physical links (e.g., links 140(2)-140(4)). The particular network path(s) over which the network traffic is routed may be dynamic, and may be a function of the topology of core network 105.

Another problem with conventional approaches to load-balancing is that such approaches are inefficient. That is, even if conventional approaches were somehow able to load-balance the sequence of packets on a flow basis over network paths 150(1)-150(3), the hashing would be unlikely to optimally spread the network traffic across network paths 150(1)-150(3). This is because conventional load-balancing approaches do not consider bandwidth commitments, and instead simply assume a near perfect distribution of network traffic across all network paths. When network paths become too highly utilized, conventional approaches upgrade the network without awareness or consideration of any specific service.

Unlike conventional approaches, PE 110(1) may perform load-balancing in an intelligent and efficient manner. In one example, PE 110(1) may equally spread the network traffic using a round robin process. In another example, PE 110(1) may load-balance the sequence of packets based on respective available bandwidths of network paths 150(1)-150(3). PE 110(1) may make this decision based on the client rate and available network link speeds of links 140(2)-140(4), rather than load-balancing the sequence of packets based on characteristics (e.g., hashes) of the network packets themselves. The exact number of network paths over which to split the traffic may be a network design decision taken during provisioning time of the connection.

Consider an example involving a network with four parallel equal cost network paths and two other "longer" network paths between an ingress PE and an egress PE. Each path includes a series of 100GE links, so the total capacity between the PEs is 600 Gbps. Initially, none of the paths are being used. A first 100GE PLE service begins operating over the network and requires 120 Gbps. It will be appreciated that 120 Gbps is merely an example, and the techniques described herein may apply to any suitable rate. The ingress PE may split the first PLE service into two portions of 60 Gbps each over two network paths using some traffic engineering technology (e.g., RSVP-TE for MPLS, SR-TE for MPLS, SRv6, etc.). The ingress PE may use traffic engineering to select any two of the six available network paths between the ingress PE and egress PE.

Now assume a second 100GE PLE service is added between the ingress and egress PEs and also requires 120 Gbps. The ingress PE may use traffic engineering techniques to determine that the two network paths currently in use do not have enough bandwidth to support the second PLE service, and as such selects two network paths of four remaining paths to carry two portions of 60 Gbps each of the second PLE service. If a third 100GE PLE service is added that also requires 120 Gbps, the ingress PE may further utilize the network paths already carrying some portion of the first and second PLE services. For example, the ingress PE may split the third PLE service into four equal 30 Gbps portions and send each portion over each of the four network paths currently carrying 60 Gbps of network traffic. As more PLE services are added, eventually the operator may utilize the full 600 Gbps available between the ingress and egress PEs. Although this example involves PLE technology, it will be appreciated that the techniques described herein may also apply to non-PLE scenarios.

Compare this to a similar situation in which conventional approaches are used. In this example, the same network has four parallel equal cost network paths and two other "longer" network paths between the ingress PE and the egress PE. An Ethernet PW over a 100GE port has four flows requiring a total 120 Gbps of capacity. Conventional Equal-Cost Multi-Path (ECMP) and hashing techniques would spread the traffic across the four ECMP network paths. Moreover, the traffic would not be split into four equal flows of 30 Gbps (unless each flow coincidentally happens to be exactly 30 Gbps). Instead, it is more likely for the traffic to be split into flows of unequal bandwidth, such as 50 Gbps on the first network path, 20 Gbps on the second network path, 40 Gbps on the third network path, and 10 Gbps on the fourth network path.

When another 100GE PW is added with four flows, ECMP techniques might cause the traffic to be split into flows of 60 Gbps on the first network path, 5 Gbps on the second network path, 10 Gbps on the third network path, and 25 Gbps on the fourth network path. This would lead to a total load of 110 Gbps on the first network path, resulting in network traffic being dropped along the first network path even though there is ample bandwidth available on the other four network paths and the two "longer" network paths have not been used at all. Thus, in this example, conventional techniques would permit use of at most 400 Gbps over the four network paths (and likely less than that due to hashing inefficiencies). Unlike conventional approaches, which face significant challenges in dealing with unequal cost (length) paths, the techniques described herein enable use of the full 600 Gbps available.

Returning now to the example of FIG. 1, network paths 150(1)-150(3) may introduce respective packet delays to the transfer of packets between PE 110(1) and PE 110(2). Packet delays may be caused by queuing delay differences of links 140(2)-140(4), such as packet delay variation due to nodal forwarding and queuing delay. Packet delays can cause packets to arrive at PE 110(2) out-of-sequence. For example, if PE 110(1) generates a first packet in the sequence and sends the first packet over network path 150(1), and then generates a second packet in the sequence and sends the second packet over network path 150(2), high packet delays associated with network path 150(1) might cause the second packet to arrive at PE 110(2) ahead of the first packet.

Conventional load-balancing approaches avoid, rather than fully resolve, this fundamental challenge by preventing re-ordering of a sequence of packets in a network. Conventional load-balancing approaches are flow-based because load-balancing based on flow ensures that a flow of packets are sent along only one path/link, which prevents a given flow from being split across different network paths. This in turn prevents a given flow of packets from arriving out-of-sequence due to packet delays of the respective network paths. Any differential delay present in the network would only lead to different delays per flow, but not to packet re-ordering within a given flow.

Conventional PLE approaches would employ a de-jitter buffer in PE 110(2) to absorb packet delay variation introduced by core network 105 between PE 110(1) and PE 110(2). Typically, PE 110(2) would fill the de jitter buffer up to 50% and then begin to empty the de-jitter buffer in a First-In, First-Out (FIFO) manner when playing out the client bit stream. If packets arrive too quickly, the fill level of the de jitter buffer would increase, and if packets arrive too slowly, the fill level of the de-jitter buffer would decrease.

For example, if the de jitter buffer has a maximum capacity of ten packets, the 50% target capacity would be five packets. If packets are arriving too quickly, the fill level of the de-jitter buffer might increase to six or seven packets, and if the packets are arriving too slowly, the fill level of the de-jitter buffer might decrease to two or three packets. The target capacity of the de-jitter buffer is typically 50% because a disruption of service can occur if the de-jitter buffer becomes completely empty or completely full.

Unlike conventional approaches, which utilize a FIFO de-jitter buffer, PE 110(2) is provided with buffer 155 to intentionally re-order packets in the correct sequence before playing out the bit stream. The content of buffer 155 (i.e., the packets) may be indexed/managed by sequence numbers to enable the re-ordering. In particular, PE 110(1) may assign sequence numbers to the sequence of packets and load-balance the sequence of packets on a per-packet basis over network paths 150(1)-150(3) to PE 110(2).

In one example, PE 110(1) may load-balance the sequence of packets in order to reduce the computing and memory resources required to re-order the sequence of packets at PE 110(2). PE 110(1) may load-balance the sequence of packet based on respective packet delays of network paths 150(1)-150(3). For instance, PE 110(1) may ensure network paths 150(1)-150(3) have a latency bound within a certain limit (e.g., to ensure network paths 150(1)-150(3) have similar packet delays). PE 110(1) may perform path calculations to select network paths (here, network paths 150(1)-150(3)) that have low latency to minimize the required memory in buffer 155. PE 110(1) may search for network paths 150(1)-150(3) that not only have sufficient bandwidth but also have a given maximum latency variance (e.g., a latency between ten and fifteen milliseconds). Minimizing differential delay between the selected network paths (here, network paths 150(1)-150(3)) lowers the memory required for buffer 155.

In another example, PE 110(1) may load-balance the sequence of packets over the smallest possible number of network paths. For example, if the available bandwidth over network paths 150(1)-150(3) is exactly 110 Gbps, PE 110(1) may select only network paths 150(1)-150(3) (e.g., load-balance all traffic to network node 125), since selecting more than three network paths may require unnecessary re-ordering at PE 110(2) due to varying packet delays. PE 110(1) may use traffic engineering techniques to select network paths 150(1)-150(3).

Upon obtaining the load-balanced packets from PE 110(1), PE 110(2) may buffer received packets that are received over network paths 150(1)-150(3) from PE 110(1). PE 110(2) may buffer the received packets in buffer 155, for example. PE 110(2) may further re-order the received packets according to sequence numbers of the received packets. Consider an example in which PE 110(2) plays out the packet assigned sequence number one and then the packet assigned sequence number two. If the next packet in line in buffer 155 is assigned sequence number four, PE 110(2) may search buffer 155 for the packet assigned sequence number three and play out that packet before playing out the packet assigned sequence number four. This in contrast to conventional approaches, which would simply play out the packet assigned sequence number four in a FIFO manner without first searching for and playing out the packet assigned sequence number three. After playing out a packet from buffer 155, PE 110(2) may convert that packet back to bits and provide the bits to CE 120(2). Thus, PE 110(2) may decide which packet to play out of buffer 155 based on the sequence numbers assigned to the buffered packets.

Buffer 155 may be configured to hold any suitable number of packets. For instance, buffer 155 may be configured to hold a given number of packets based on the respective packet delays of network paths 150(1)-150(3). In one specific example, buffer 155 may be set to a given number of packets that is equal to two-hundred microseconds, which means that in a normal state buffer 155 would hold one-hundred microseconds' worth of packets. Buffer 155 may be configured for a packet delay variation in network paths 150(1)-150(3) of approximately ten microseconds.

Figure 2:
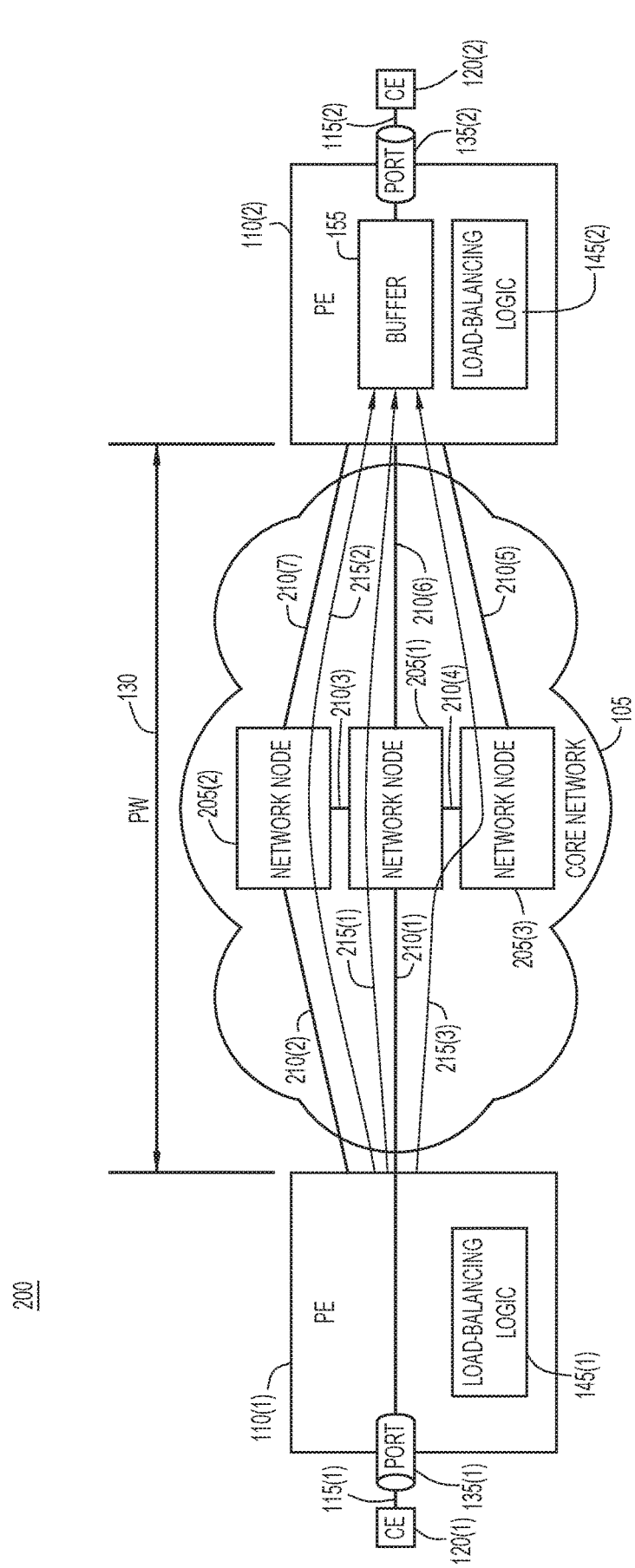
FIG. 2 illustrates a block diagram of a system configured for per-packet load-balancing over multiple network paths that include respective network nodes, according to an example embodiment.

Turning now to FIG. 2, and with continuing reference to FIG. 1, shown is a block diagram of system 200 configured for per-packet load-balancing. Briefly, system 200 illustrates another example topology that may apply to the techniques described herein. It will be appreciated that any suitable topology may be implemented in accordance with these techniques. Like system 100, system 200 includes core network 105, PEs 110(1) and 110(2), ACs 115(1) and 115(2), and CEs 120(1) and 120(2), PW 130, ports 135(1) and 135(2), load-balancing logic 145(1) and 145(2), and buffer 155. Unlike system 100, core network 105 includes network nodes 205(1)-205(3), which are configured to carry network packets over PW 130.

Core network 105 also includes links (e.g., interfaces) 210(1)-210(7). Link 210(1) is between PE 110(1) and network node 205(1). Link 210(2) is between PE 110(1) and network node 205(1). Link 210(3) is between network node 205(1) and network node 205(2). Link 210(4) is between network node 205(1) and network node 205(3). Link 210(5) is between network node 205(3) and PE 110(2). Link 210(6) is between network node 205(1) and PE 110(2). Link 210(7) is between network node 205(2) and PE 110(2). In one example, link 210(1) is configured to carry a maximum of 400GE of network traffic, and links 210(2)-210(7) are each configured to carry a maximum of 100GE of network traffic.

Consider the aforementioned example involving the emulated 100GE connection between CE 120(1) and CE 120(2) that requires a total of 110 Gbps of bandwidth. Here, PE 110(1) may assign sequence numbers to the sequence of packets and load-balance the sequence of packets on a per-packet basis over network paths 215(1)-215(3) to PE 110(2). Network path 215(1) includes link 210(1), network node 205(1), and link 210(6). Network path 215(2) includes link 210(2), network node 205(2), and link 210(7). Network path 215(3) includes link 210(1), network node 205(1), link 210(4), network node 205(3), and link 210(5). PE 110(2) may buffer received packets that are received over network paths 215(1)-215(3) from PE 110(1) and re-order the received packets according to sequence numbers of the received packets.

In one example, network paths 215(1)-215(3) introduce respective packet delays to the transfer of packets between PE 110(1) and PE 110(2). Packet delays may be caused by differential delays between network paths 215(1)-215(3) due to the network topology of system 200. These delays may be introduced, for example, by geographical differences between network nodes 205(1)-205(3). The size of buffer 155 may be defined by the amount of differential delay and consequential re-ordering of the sequence of packets at PE 110(2). Thus, the complexity of the network topology of system 200 may affect how much memory is allocated to buffer 155.

More complex topologies, such as the topology illustrated in system 200, may require enough memory in buffer 155 to not only deal with packet delay variation but also network/path differential delay between network paths 215(1)-215(3). For example, for each kilometer of difference in the path lengths of network paths 215(1)-215(3), an additional five microseconds of delay may be assumed. The greater the differential distance between network paths 215(1)-215(3), the more memory may be required to buffer the packets in buffer 155.

Figure 3:
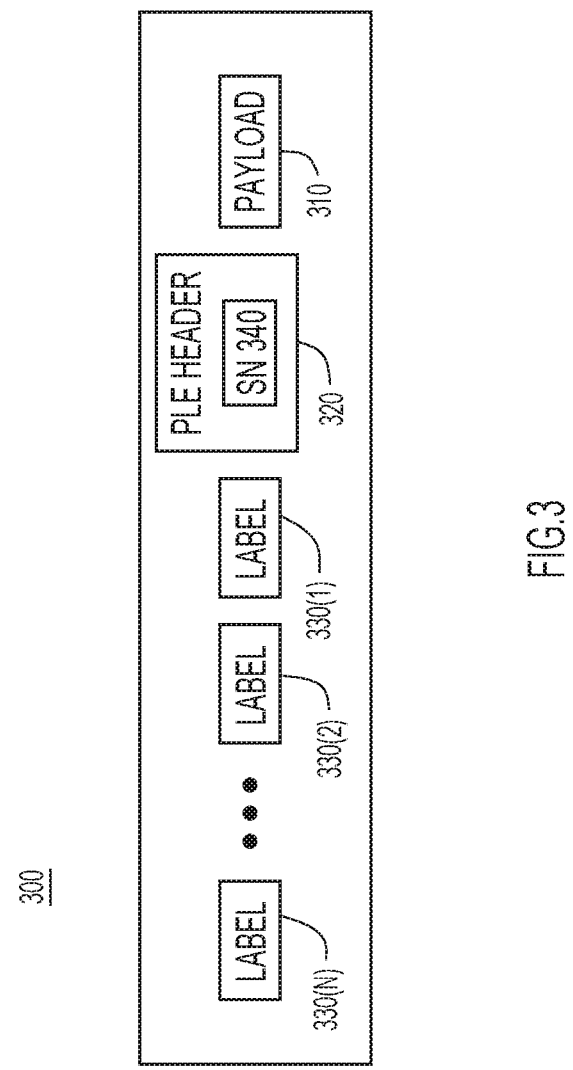
FIG. 3 illustrates a logical representation of a packet format that includes sequence number information, according to an example embodiment.

With continued reference to FIG. 1, FIG. 3 illustrates a logical representation of an example packet format 300 that includes sequence number information. Packet format 300 may be the format of each packet in the sequence of packets load-balanced by PE 110(1). Packet format 300 includes payload 310, PLE header 320, and labels 330(1)-330(N). Payload 310 includes the subset of bits in the bit stream obtained by PE 110(1) from CE 120(1). Labels 330(1)-330(N) may be a flow representation that determines how the packet is routed through core network 105.

PLE header 320 includes sequence reordering information, such as sequence number 340. In one example, PLE header 320 may include a Real-time Transport Protocol (RTP) header used to implement circuit emulation (e.g., to facilitate clock transport Differential Clock Recovery (DCR)). In addition/alternatively, PLE header 320 may include a Control Word (CW). The RTP header and/or CW may include sequence number 340 to enable packet reordering. Any suitable mechanism for carrying sequence number 340 may be utilized.

Figure 4:
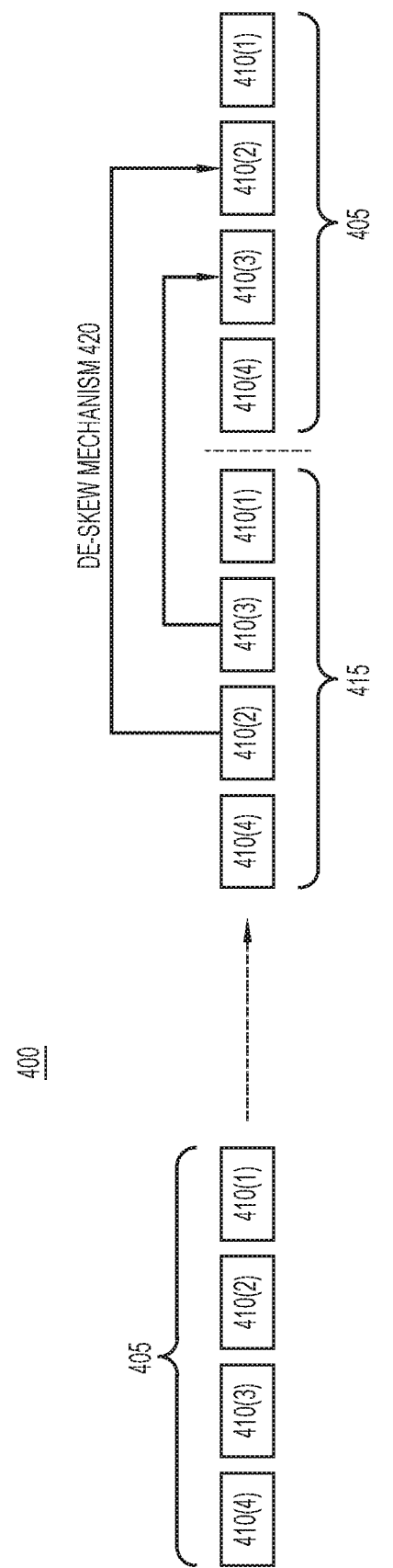
FIG. 4 illustrates a graphical representation of a process for re-ordering a sequence of packets based on sequence numbers, according to an example embodiment.

With continued reference to FIG. 1, FIG. 4 illustrates a graphical representation of an example process 400 for re-ordering a sequence of packets based on sequence numbers. As shown on the left side of FIG. 4, PE 110(1) generates a sequence 405 of packets 410(1)-410(4) in order, assigns each packet 410(1)-410(4) a respective sequence number, and load-balances packets 410(1)-410(4) over multiple network paths to PE 110(2). Packet 410(1) may be assigned sequence number one, packet 410(2) may be assigned sequence number two, packet 410(3) may be assigned sequence number three, and packet 410(4) may be assigned sequence number four.

Because of the different packet delays associated with the multiple network paths, PE 110(2) obtains packets 410(2) and 410(3) in the wrong order (out of sequence) as shown at sequence 415. In particular, packets 410(1)-410(4) arrive in the following order for storage in buffer 155: packet 410(1), packet 410(3), packet 410(2), and packet 410(4). PE 110(2) implements de-skew mechanism 420 whereby PE 110(2) re-orders the packets based on their sequence numbers (by switching packets 410(2) and 410(3)), and plays out packets 410(1)-410(4) in sequence 405 (i.e., packet 410(1), packet 410(2), packet 410(3), packet 410(4)).

Figure 5:
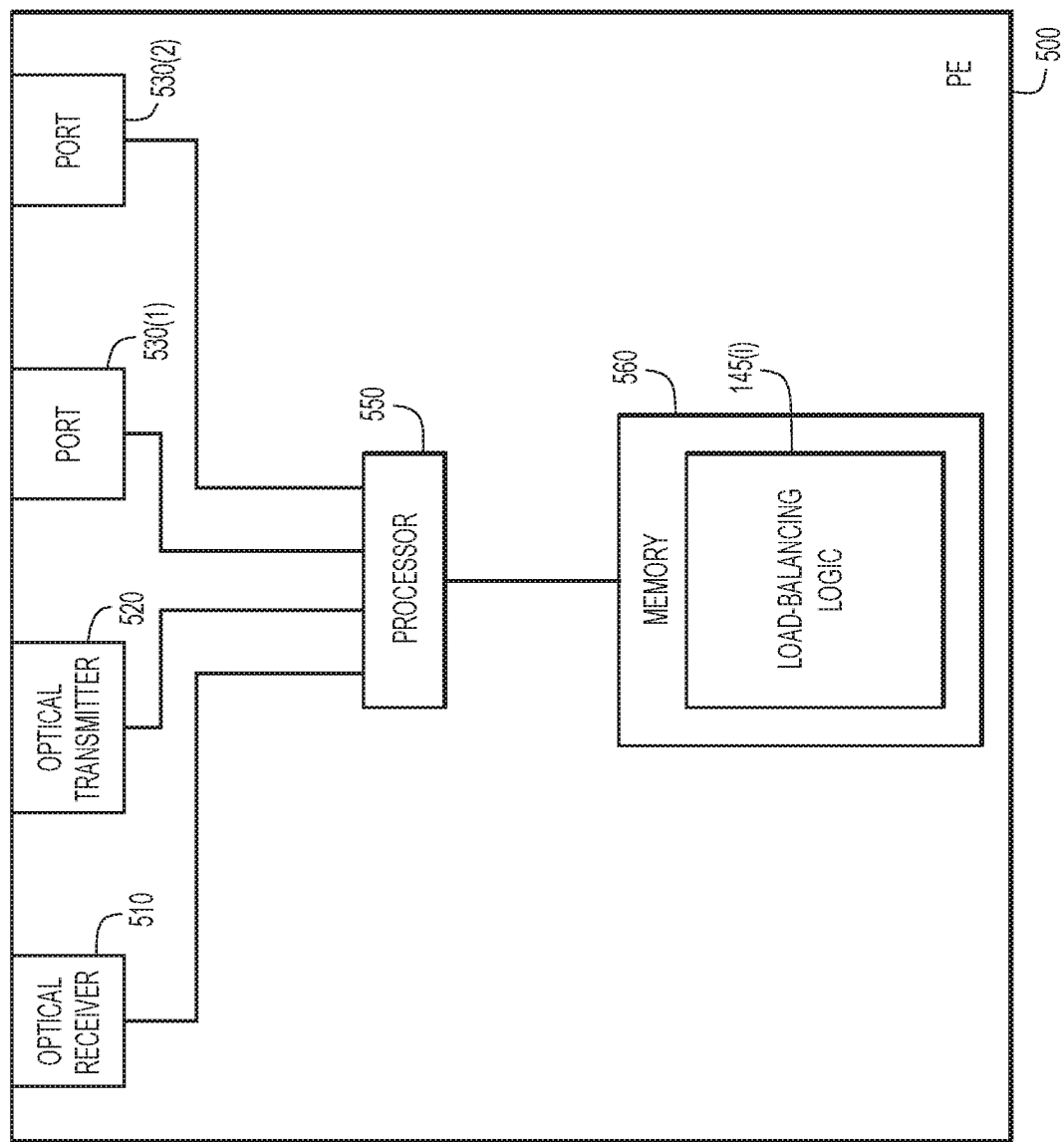
FIG. 5 illustrates a block diagram of a network node configured for per-packet load-balancing over multiple network paths, according to an example embodiment.

FIG. 5 is a block diagram of an example network node 500 (e.g., PEs 110(1) or 110(2)) that is configured to implement techniques presented herein. Network node 500 includes a network interface in the form of optical receiver 510 and optical transmitter 520 (including optical and electrical modules), which enable communications over an optical network (e.g., communications to/from CEs 120(1) and 120(2)), and ports 530(1) and 530(2), which enable communications over a packet-based network (e.g., core network 105). Network node 500 also includes one or more processors 550 and memory 560. Processor(s) 550 may include any suitable processing entity, such as microprocessors, microcontrollers, Field-Programmable Gate Arrays (FPGAs), Application-Specific Standard Parts (ASSPs), Application Specific Integrated Circuits (ASICs), etc. Other embodiments may be envisioned.

Memory 560 may include read only memory (ROM), Random Access Memory (RAM), magnetic disk storage media devices, optical storage media devices, Flash memory devices, electrical, optical, or other physical/tangible memory storage devices. Thus, in general, memory 560 may comprise one or more tangible (non-transitory) computer readable storage media (e.g., a memory device) encoded with software comprising computer executable instructions and when the software is executed (e.g., by the one or more processors) it is operable to perform operations described herein. In particular, memory 560 includes load-balancing logic **145(*i*) (e.g., load-balancing logic 145(1) or 145(2)) that, when executed, enables network node 500** to perform the techniques described herein.

Figure 6:
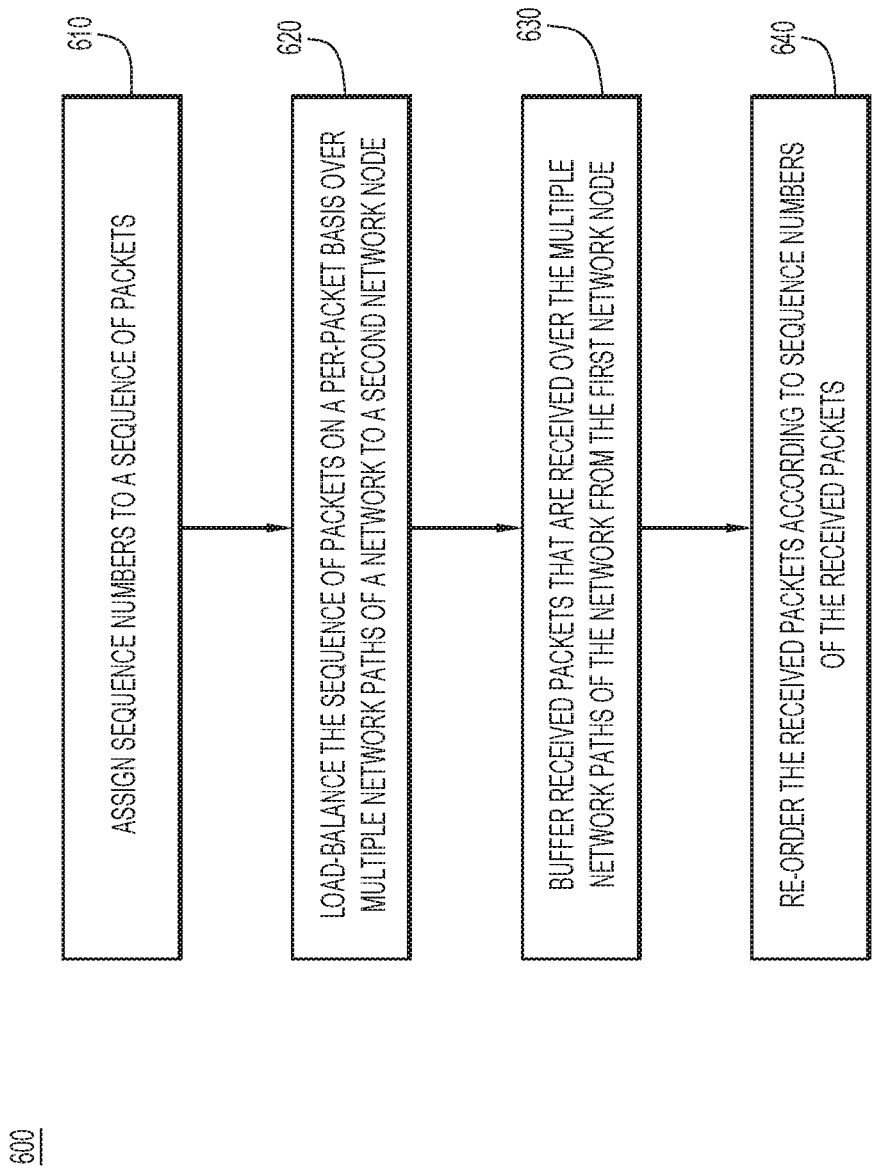
FIG. 6 illustrates a flowchart of a method for load-balancing a sequence of packets over multiple network paths on a per-packet basis, according to an example embodiment.

FIG. 6 is a flowchart of an example method 600 for load-balancing a sequence of packets over multiple network paths on a per-packet basis. At operation 610, a first network node assigns sequence numbers to a sequence of packets. At operation 620, the first network node load-balances the sequence of packets on a per-packet basis over multiple network paths of a network to a second network node. At operation 630, the second network node buffers received packets that are received over the multiple network paths of the network from the first network node. At operation 640, the second network node re-orders the received packets according to sequence numbers of the received packets.

Techniques described herein may address the challenge of carrying emulated high-capacity circuits (such as 100GE or 400GE) across a packet network comprised of interfaces with limited bandwidth (e.g., 100GE). This may involve splitting traffic into portions having relatively low end-to-end bandwidth requirements satisfied by traffic engineering, and further applying a sequencing mechanism to implement a segmentation and reassembly capability during the emulation process. For example, an "elephant flow" may be split into multiple small portions using a per-packet load-balancing and re-ordering scheme, and mapping each flow into a traffic-engineered path to guarantee the bandwidth end-to-end across the packet-switched network. The techniques described herein may address problems in conventional approaches at the service layer from an end-to-end perspective without requiring dependency on hardware used to interconnect nodes along the network path(s). Customers may deploy these services without being required to fundamentally change the underlying network.

While examples described herein focus on PLE, non-PLE services may suffer from similar elephant flow problems discussed above. For example, any application transmitting large amounts of data may introduce flows with identical/common 5-tuples and large bandwidth requirements. The flows identified via the hashing (even 5-tuples) can be relatively large and have varying sizes. In such cases the assumption of small sub-flows is no longer valid and conventional approaches based on network design can face challenges, whereas the techniques described herein may be applied to such applications.

These techniques may also apply to cases where the hashing cannot locate 5-tuples and instead only 2-tuples (e.g., source IP address and destination IP address), or even only outer MPLS or Ethernet headers which are constant in every packet in a PW. These techniques may still further be applied to data-based replication flows or non-PLE services where no small granular sub-flows are present. Furthermore, while the example described herein focuses on a PLE PW, an Ethernet PW (e.g., using Ethernet VPWS) may also be used in accordance with the techniques described herein to enable the packets to flow from a first network node to a second network node. In addition, these techniques are not necessarily limited to use cases in which the stream of packets contains only a single flow. These techniques may also apply to scenarios involving giant database replication flows that do not fit into smaller pipes across the network.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, a method is provided. The method comprises: at a first network node: assigning sequence numbers to a sequence of packets; and load-balancing the sequence of packets on a per-packet basis over multiple network paths of a network to a second network node; and at the second network node: buffering received packets that are received over the multiple network paths of the network from the first network node; and re-ordering the received packets according to sequence numbers of the received packets.

In one example, the method further comprises: at the first network node: obtaining a sequence of bits; and converting the sequence of bits to the sequence of packets.

In one example, the method further comprises: at the second network node: converting the received packets to the sequence of bits.

In one example, load-balancing the sequence of packets includes: load-balancing the sequence of packets based on respective available bandwidths of the multiple network paths.

In one example, load-balancing the sequence of packets includes: load-balancing the sequence of packets based on respective packet delays of the multiple network paths.

In one example, the multiple network paths include respective parallel links.

In one example, the multiple network paths include respective network nodes.

In one example, load-balancing the sequence of packets includes: communicating with the second network node over the network using private line emulation techniques or Ethernet virtual private wire service techniques.

In one example, load-balancing the sequence of packets includes: transmitting the sequence of packets in a single pseudowire over the network from the first network node to the second network node.

In one example, the sequence of packets includes a sequence of packets that each share common flow information.

In another form, a system is provided. The system comprises: a first network node and a second network node; wherein the first network node is configured to: assign sequence numbers to a sequence of packets; and load-balance the sequence of packets on a per-packet basis over multiple network paths of a network to a second network node; and wherein the second network node is configured to: buffer received packets that are received over the multiple network paths of the network from the first network node; and re-order the received packets according to sequence numbers of the received packets.

In another form, one or more non-transitory computer readable storage media are provided. The one or more non-transitory computer readable storage media are encoded with instructions that, when executed by one or more processors, cause the one or more processors to: at a first network node: assign sequence numbers to a sequence of packets; and load-balance the sequence of packets on a per-packet basis over multiple network paths of a network to a second network node; and at the second network node: buffer received packets that are received over the multiple network paths of the network from the first network node; and re-order the received packets according to sequence numbers of the received packets.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a first network node:
        assigning sequence numbers to a sequence of packets; and
        load-balancing the sequence of packets on a per-packet basis over multiple network paths of a network to a second network node, including transmitting the sequence of packets in a single pseudowire over the network from the first network node to the second network node; and
    at the second network node:
        buffering received packets that are received over the multiple network paths of the network from the first network node; and
        re-ordering the received packets according to sequence numbers of the received packets.

2. The method of claim 1, further comprising:
    at the first network node:
        obtaining a sequence of bits; and
        converting the sequence of bits to the sequence of packets.

3. The method of claim 2, further comprising:
    at the second network node:
        converting the received packets to the sequence of bits.

4. The method of claim 1, wherein load-balancing the sequence of packets includes:

load-balancing the sequence of packets based on respective available bandwidths of the multiple network paths.

5. The method of claim 1, wherein load-balancing the sequence of packets includes:
load-balancing the sequence of packets based on respective packet delays of the multiple network paths.

6. The method of claim 1, wherein the multiple network paths include respective parallel links.

7. The method of claim 1, wherein the multiple network paths include respective network nodes.

8. The method of claim 1, wherein load-balancing the sequence of packets includes:
communicating with the second network node over the network using private line emulation techniques or Ethernet virtual private wire service techniques.

9. The method of claim 1, wherein the sequence of packets includes a sequence of packets that each share common flow information.

10. A system comprising:
a first network node and a second network node;
wherein the first network node is configured to:
assign sequence numbers to a sequence of packets; and
load-balance the sequence of packets on a per-packet basis over multiple network paths of a network to a second network node, including transmitting the sequence of packets in a single pseudowire over the network from the first network node to the second network node; and
wherein the second network node is configured to:
buffer received packets that are received over the multiple network paths of the network from the first network node; and
re-order the received packets according to sequence numbers of the received packets.

11. The system of claim 10, wherein the first network node is further configured to:
obtain a sequence of bits; and
convert the sequence of bits to the sequence of packets.

12. The system of claim 11, wherein the second network node is further configured to:
convert the received packets to the sequence of bits.

13. The system of claim 10, wherein the first network node is further configured to:
load-balance the sequence of packets based on respective available bandwidths of the multiple network paths.

14. The system of claim 10, wherein the first network node is further configured to:
load-balance the sequence of packets based on respective packet delays of the multiple network paths.

15. One or more non-transitory computer readable storage media encoded with instructions that, when executed by one or more processors, cause the one or more processors to:
at a first network node:
assign sequence numbers to a sequence of packets; and
load-balance the sequence of packets on a per-packet basis over multiple network paths of a network to a second network node, including transmitting the sequence of packets in a single pseudowire over the network from the first network node to the second network node; and
at the second network node:
buffer received packets that are received over the multiple network paths of the network from the first network node; and
re-order the received packets according to sequence numbers of the received packets.

16. The one or more non-transitory computer readable storage media of claim 15, wherein the instructions further cause the one or more processors to:
at the first network node:
obtain a sequence of bits; and
convert the sequence of bits to the sequence of packets.

17. The one or more non-transitory computer readable storage media of claim 16, wherein the instructions further cause the one or more processors to:
at the second network node:
convert the received packets to the sequence of bits.

18. The one or more non-transitory computer readable storage media of claim 15, wherein the instructions further cause the one or more processors to:
load-balance the sequence of packets based on respective available bandwidths of the multiple network paths.

19. The one or more non-transitory computer readable storage media of claim 15, wherein the instructions further cause the one or more processors to:
load-balance the sequence of packets based on respective packet delays of the multiple network paths.

20. The method of claim 1, wherein the single pseudowire is configured on the first network node and the second network node.

* * * * *